United States Patent [19]

Araki

[11] 4,357,090

[45] Nov. 2, 1982

[54] EXPOSURE CONTROL APPARATUS FOR CAMERA WITH INTERCHANGEABLE LENS

[75] Inventor: Yoshitaka Araki, Tokyo, Japan

[73] Assignee: Nippon Kogaku K.K., Tokyo, Japan

[21] Appl. No.: 303,576

[22] Filed: Sep. 18, 1981

Related U.S. Application Data

[63] Continuation of Ser. No. 216,279, Dec. 15, 1980, abandoned.

[30] Foreign Application Priority Data

Dec. 28, 1979 [JP] Japan .................................. 54/172191

[51] Int. Cl.³ .............................................. G03B 17/14
[52] U.S. Cl. .................................................. 354/286
[58] Field of Search .......................... 354/46, 286, 289

[56] References Cited

U.S. PATENT DOCUMENTS 4,198,141 4/1980 Tominaga et a. ...................... 354/46

Primary Examiner—Michael L. Gellner
Attorney, Agent, or Firm—Fitzpatrick, Cella, Harper & Scinto

[57] ABSTRACT

A camera comprising a detecting device capable of mounting an interchangeable lens having a signalling device for transmitting information of the fully open aperture of the lens to the camera and a diaphragm adapted to be controlled from said camera at the picture taking operation and further capable of detecting said information of the fully open aperture, and an exposure control device capable of calculating a combination of a diaphragm aperture and an exposure time for the exposure control at the picture taking operation from information of an object light received through the interchangeable lens and correcting the combination by means of the information obtained from the detecting device, or an exposure control device comprising a calculating circuit for calculating a combination of a diaphragm aperture and an exposure time for the exposure control at the picture taking operation from information of an object light received through said interchangeable lens and the information obtained from the detecting device.

The detecting device comprises means for producing an electric output signal corresponding to the information of the fully open aperture in engagement with the signalling device upon mounting of such interchangeable lens, or an electric output signal corresponding to a particular diaphragm aperture upon detection of the absence of the engagement.

6 Claims, 6 Drawing Figures

EXPOSURE CONTROL APPARATUS FOR CAMERA WITH INTERCHANGEABLE LENS

This is a continuation of application Ser. No. 216,279, filed Dec. 15, 1980, now abandoned.

BACKGROUND OF THE INVENTION

1. Field of the Invention

The present invention relates to an exposure control apparatus for use in a photographic camera with interchangeable lenses.

2. Description of the Prior Art

There is already known, for exposure control in the single lens reflex camera with interchangeable lens employing the through-the-lens (TTL) light measurement, an exposure control apparatus capable of so-called automatic programmed exposure in which the diaphragm aperture of the lens is automatically regulated in response to a program value determined according to the brightness of the object. Also there is known such exposure control apparatus in which the measured output of the light from the object coming through the adjusted diaphragm aperture and the output of position detecting means for a diaphragm adjusting member are used as the input signals for a shutter speed calculating circuit to obtain a shutter speed corresponding to the adjusted diaphragm aperture.

In case of using the single lens reflex camera having such through-the-lens (TTL) exposure control apparatus with interchangeable lenses of different maximum diapragm apertures, the camera is required to identify the maximum diaphragm aperture of the lens used in order to obtain a same combination of a diaphragm aperture and a shutter speed for the object of a determined brightness regardless of the maximum aperture of the lens and such requirement is achieved for example by the invention of the present applicant disclosed in the U.S. patent application Ser. No. 971,825 or German patent application No. DT P2,856,307.7 corresponding to the Japanese Patent Laid-Open No. 54-78127.

For this purpose each interchangeable lens for use in the camera having such exposure control apparatus is required to have a specific signal member for transmitting the maximum lens aperture to the camera as a direct signal or an indirect compound signal in combination with another signalling member.

For the convenience of customers, the interchangeability of a new lens or camera with those already in the market is a major concern for a camera manufacturer, and it is strictly undesirable to provide a new camera not allowing the use of the interchangeable lenses sold before. For this reason, in case a manufacturer having sold interchangeable lenses not provided with signalling means for the maximum lens aperture provides a new lens-interchangeable camera with the above-mentioned exposure control, it is desirable to allow the customers to use said new camera in combination with the interchangeable lenses already sold, but such objective has not been achieved in the prior art.

SUMMARY OF THE INVENTION

The object of the present invention is to provide a solution to the above-mentioned objective in a simple manner. According to the present invention the above-mentioned object is achieved by an exposure control apparatus for use in a camera with automatic programmed exposure control having a mechanism for detecting the maximum aperture of the interchangeable lens mounted on the camera, said apparatus being capable of detecting that the interchangeable lens in use is not provided with a signal member for transmitting the maximum aperture to the camera and of performing, in response to such detection, exposure control by means of a signal corresponding to a particular aperture signal within a range determined by said detecting mechanism thereby enabling the use of interchangeable lenses not equipped with such signal members.

DESCRIPTION OF THE PREFERRED EMBODIMENTS

Now the present invention will be clarified in detail by the following description of the embodiments thereof to be taken in conjunction with the attached drawings.

Figure 1A:
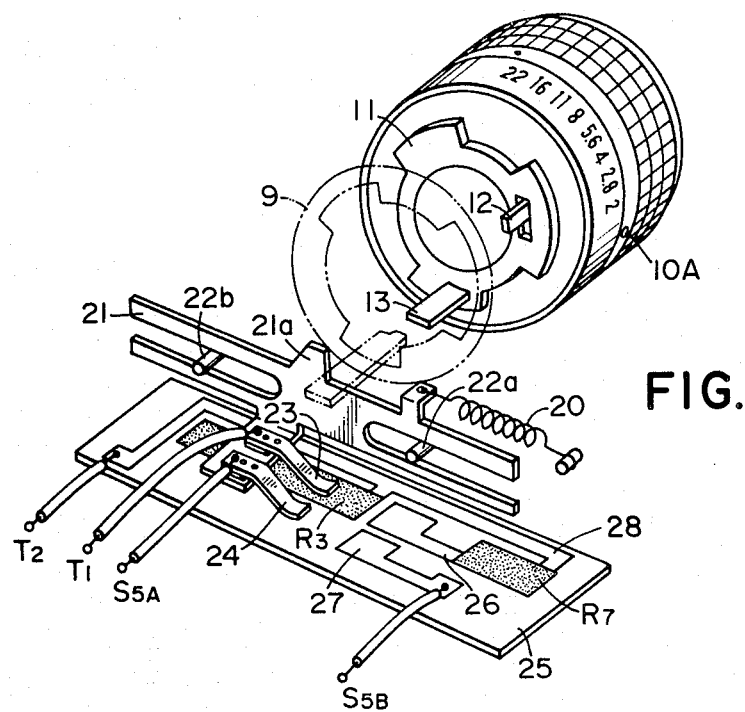
FIG. 1 is a perspective view of an embodiment of the maximum lens aperture detecting mechanism of the present invention wherein FIG. 1A and FIG. 1B respectively show the cases in which the mounted lens is equipped and not equipped with a signal member.
Figure 1B:
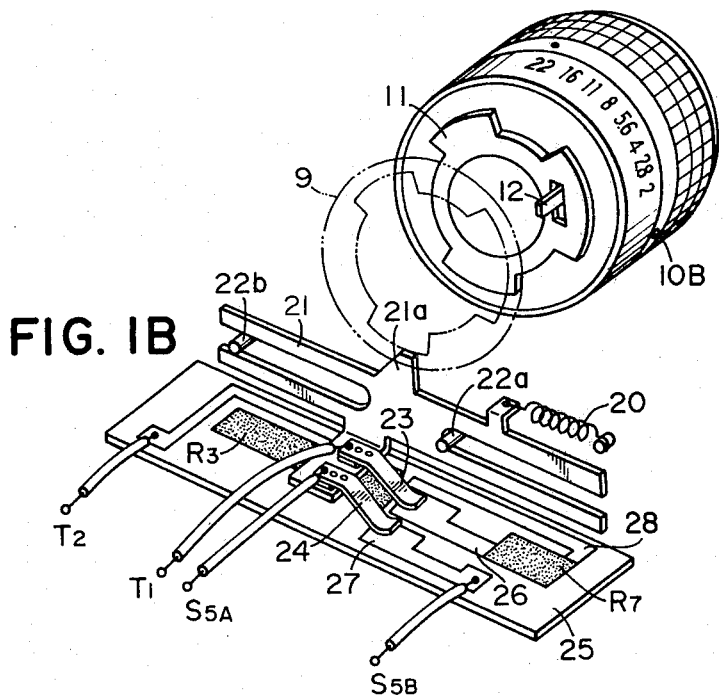

FIGS. 1A and 1B show an embodiment of the maximum lens aperture detecting mechanism of the present invention, mounted respectively with an interchangeable lens having a maximum aperture signalling member and a conventional lens not have such signalling member.

The interchangeable lens 10A or 10B is provided with diaphragm blades for defining the diaphragm aperture, a bayonet mount 11 for coupling with a mount 9 provided in the camera, and an automatic diagrapm lever 12 for reducing the diaphragm aperture in cooperation with an automatic diaphragm adjust mechanism provided in the camera body. In addition the lens 10A shown in FIG. 1A is provided with a maximum aperture signalling projection 13 which is provided anew in a position not interfering with the mechanisms of the camera conventionally sold and which is so designed in size or position thereof to indicate the maximum lens aperture.

In the camera body there are provided a slide lever 21 biased to the right by a tension spring 20 and guided by guide pins 22a, 22b, and a fixed plate 25. Said slide lever 21 is provided with a signal receiving projection 21a in a position corresponding to a peripheral area of the aperture of the mount 9, and mutually insulated brushes 23, 24 in sliding contact with said plate 25. On said plate 25 there are printed resistors R3, R7 and conductors 26, 27, 28, said conductor 26 constituting a terminal of said resistor R7 while said conductor 28 constitutes terminals of said resistors R3 and R7. Said slide lever 21 is so positioned with respect to the plate 25 that the brushes 23, 24 are in contact respectively with the terminals 26, 27 when the lever 21 is closest to the spring 20 and the brush 23 slides on the resistor R3 when the lever 21 is displaced against the function of said spring 20, whereby the brush 23 and resistors R3, R7 constitute a variable resistor to give a varying resistance between terminals T1, T2 and the brush 24 and terminal 27 constitute a switch S5 between terminals S5A, S5B. The brush and terminal 27 are preferably so positioned as to be in mutual contact only in the initial position of the slide lever 21 and to open the switch S5 as soon as said lever 21 is displaced.

The interchangeable lens 10A or 10B is mounted on the camera body by fitting the bayonet mount 11 in the camera mount 9 and rotating said bayonet mount clockwise in the illustration. In case of the lens 10A (FIG. 1A) the projection 13 along with said rotation engages with the projection 21a of the slide lever 21, causing leftward displacement of said lever 21 and displacement of brushes 23, 24 on the plate 25. Upon completion of the lens mounting operation, the slide lever 21 is maintained in a fixed position to determine the resistance between the terminals T1, T2 and to open the switch S5 in which the brush 24 is disengaged from the terminal 27. The amount of brush displacement to this state is determined by the position or dimension of the signalling projection 13. As the interchangeable lens shown in FIG. 1A has a maximum aperture of F2, the resistance between the terminals T1, T2 obtained when said lens is mounted corresponds to the maximum aperture of F2.

When the lens 10B not equipped with the projection 13 is mounted on the camera body, the slide lever 21 remains in the initial position defined by the spring 20 and guide pins 22a, 22b as shown in FIG. 1B, whereby the brushes 23, 24 remain respectively on the terminals 26, 27 to give the resistance of the resistor R7 to the terminals T1, T2 and to maintain the switch S5 in closed state.

Figure 2A:
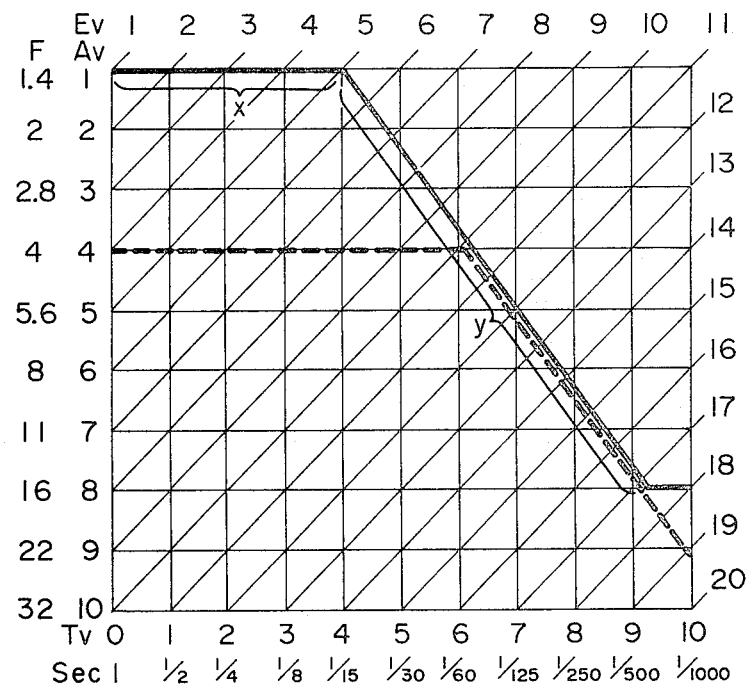
FIG. 2 is a chart of the exposure control program of the shutter speed and the diaphragm aperture according to the present invention wherein FIG. 2A and FIG. 2B respectively show the cases in which the mounted lens is equipped with and not equipped with a signal member.
Figure 2B:
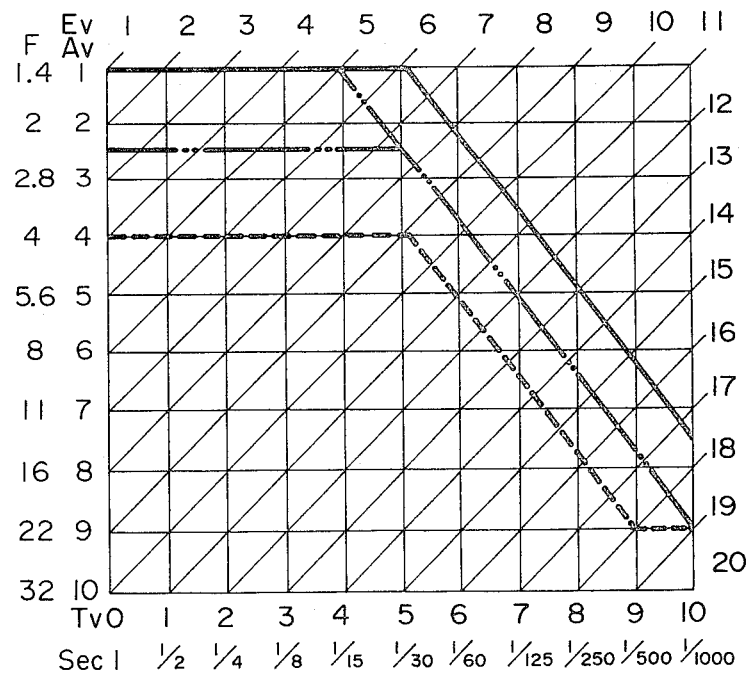

FIGS. 2A and 2B show the programs of shutter speed and diaphragm aperture in the automatic programmed exposure control achieved in the camera embodying the present invention.

FIG. 2A shows the examples of programs with interchangeable lenses equipped with the aforementioned signalling projection 13, wherein the full line and broken line respectively indicate the cases with a lens A of a smallest stop number (maximum aperture) of F1.4 and a largest stop number of F16, and with a lens B of a smallest stop number of F4 and a largest stop number of F22, while FIG. 2B shows the corresponding examples of programs with interchangeable lenses A', B' with some smallest and largest stop numbers as mentioned above but not equipped with said signalling projection 13, respectively by the full line and broken line.

Each program line consists of three sections; a section x in which the shutter speed alone changes with the increase of the exposure value Ev while the diaphragm aperture remains at the smallest stop number, a section y in which both the shutter speed and stop number change, and a section z in which the shutter speed alone changes while the diaphragm aperture remains at the largest stop number.

In the programs for the lenses A, B shown in FIG. 2A, the control is so conducted as to obtain a common section y from the detection of the maximum lens aperture, thereby providing a same combination of the shutter speed and the stop number for a same exposure value within the regulable range of the diaphragm aperture. For the purpose of more detailed explanation there will be derived numerical representation for the section y in the following, in which the APEX representations Av, Tv, Ev, Bv and Sv will be employed for clarity.

The relation in the section y can be generally represented by:

$$Tv = \alpha Av + \gamma \tag{1}$$

wherein $\alpha$ and $\gamma$ are constants. This relation can be rewritten by introducing the equation in APEX representation for appropriate exposure:

$$Av + Tv = Bv + Sv$$

into:

$$Tv = \frac{\alpha}{1+\alpha}(Bv + Sv) + \frac{\gamma}{1+\alpha} \tag{2}$$

whereby the controlled time value Tv is determined by the luminance value Bv of the object received by the photoreceptor element.

In case of the through-the-lens light measurement, however, it is not possible the value of Bv itself, and the output from the photoreceptor element always provides a signal Bv−Avo, including the information Avo concerning the smallest stop number of the interchangeable lens. If this signal is inserted into the equation (2) there will result:

$$Tv = \frac{\alpha}{1+\alpha}(Bv - Avo + Sv) + \frac{\gamma}{1+\alpha} \tag{3}$$

whereby the value of Tv varies according to the smallest stop number Avo of the lens even for a same luminance value Bv of the object and for a same ASA speed value Sv, thus resulting in the change of Av for obtaining an appropriate exposure. Consequently the combination of Tv and Av for same Bv and Sv, i.e. for a same Ev varies according to the Avo value of the interchangeable lens, thus resulting in two parallel diagonal lines in the section y for the lenses A and B, mutually parallel but separated by a distance corresponding to the difference of Avo=1 for the lens A and Avo=4 for the lens B, instead of the unified section y shown in FIG. 2A. In the present invention the equation (3) is further given the information on the smallest stop number of each lens as shown by:

$$Tv = \frac{\alpha}{1+\alpha}(Bv + Sv - Avo) + \frac{1}{1+\alpha}(\alpha Avo + \gamma) \tag{4}$$

to eliminate the effect of said smallest stop number Avo. In this manner the different sections y are displaced along the Tv axis to obtain a unified section y, and the shutter speed for the appropriate exposure is calculated according to said equation (4).

In the sections x and z it is not necessary to obtain such relation since, as the stop number is no longer variable in these sections, the program is controlled by the change in the shutter speed in response to the change in Ev value and is therefore determined automatically if the section y is determined.

On the other hand, in case of an interchangeable lens not equipped with the signalling projection for the maximum lens aperture, the programmed exposure control may result in a Tv value considerably different from the desirable value. According to the present invention, therefore, in order to achieve a practically programmed exposure control also in combination with the interchangeable lens not equipped with such signalling projection, information representing a fixed maximum aperture commonly used is provided by the resistor R7 in case the information on the maximum aperture of the lens used is not provided by the variable resistor R3. In the present embodiment the resistance of R7 is selected corresponding to a stop number of F2.4, in consideration of the fact that the maximum aperture or the smallest stop number of the commercially available interchangeable lenses is generally within a range of F1.2 to F4.5, particularly F1.8 to F3.5. However said resistance is not necessarily determined so as to minimize the program error for the lenses not equipped with the signalling projection. For example in consideration of the fact that the smallest stop number becomes larger (smaller maximum aperture) generally in the telephone lenses, it is possible to give a priority in the program to a combination of using a faster shutter speed, as is achievable by selecting a resistance for R7 corresponding to a larger stop number. In this manner said selection should be made according to the principal usage or the function of the camera to which the present invention is applied.

FIG. 2B shows two program lines obtained when the camera is mounted with two different interchangeable lenses not equipped with the signalling member for the smallest stop number, wherein the full-lined program for the lens of F1.4 and the broken-lined program for the lens of F4 are respectively distant, at a same Ev value, from the standard program represented by double-dotted chain line by ±0.64 in Tv value. For example at a standard shutter speed of 1/125 seconds, these two programs will respectively give shutter speeds of 1/200 and 1/80 seconds.

The program lines shown in FIGS. 2A and 2B correspond to the case of $\alpha = 0.75$ in the aforementioned equation.

Figure 3:
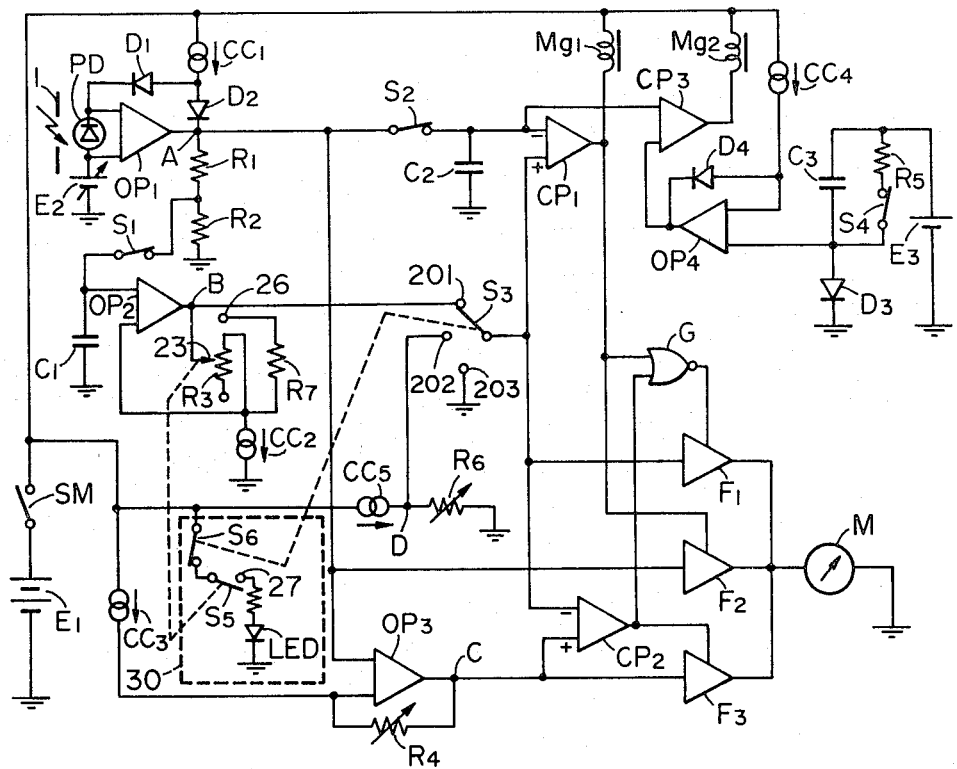
FIG. 3 is a circuit showing an embodiment of the present invention.

Now there will be given an explanation on the circuit and the function thereof. The embodiment of the present invention shown in FIG. 3 represents a multi-mode camera capable of automatic exposure control with so-called shutter speed priority mode and with aperture priority mode, in addition to the programmed automatic exposure control.

In the programmed exposure mode a switch $S_3$ is positioned at a terminal 201 and the aperture adjust ring of the lens is positioned at the largest stop number (F16 for the lenses A and A', and F22 for the lenses B and B'). When the shutter button is depressed, a power switch $S_M$ is closed at the first stage of the shutter stroke to supply power to the entire circuit from a battery E1. A photodiode PD generates a photocurrent proportional to the intensity of the light received through the lens and diaphragm 1. Said photocurrent is subjected to a logarithmic compression by an operational amplifier OP1 and a diode D1. A constant-current source CC1 and a diode D2 are provided for compensating the temperature characteristic of the diode D1. In this state the lens diaphragm is still fully open since the unrepresented diaphragm closing lever of the camera engaging with the diaphragm lever 12 of the lens shown in FIG. 1 has not been moved.

Consequently the light entering the photodiode PD corresponds to the luminance of the object minus the information of the maximum lens aperture, which can be represented by $(Bv - Avo)$ in APEX representation. The operational amplifier OP1, receiving a voltage corresponding to the film sensivity Sv from a variable voltage circuit E2, provides to the output terminal A a voltage $V_A$:

$$V_A = (Bv + Sv - Avo) \quad (5)$$

which is divided by resistors R1 and R2. Said resistors R1, R2 are so selected as to have a ratio $\alpha/(1+\alpha)$ appearing as the coeffficient in the equation (4), whereby the voltage at the junction point between said resistors R1, R2 becomes equal to $$\frac{\alpha}{1+\alpha}(Bv + Sv - Avo),$$

which is supplied to an amplifier OP2 through a switch S1. There is also supplied a voltage $$\frac{1}{1+\alpha}(\alpha Avo + \gamma)$$

by a constant voltage source CC2 and the variable resistor R3, whereby said amplifier OP2 provides at the output terminal B a voltage $V_B$:

$$V_B = \frac{\alpha}{1+\alpha}(Bv + Sv - Avo) + \frac{1}{1+\alpha}(\alpha Avo + \gamma) \quad (6)$$

corresponding to Tv in the equation (4).

In case of using lenses not equipped with the signalling member as shown in FIG. 1B, there is provided a signal $$\frac{1}{1+\alpha}(\alpha Avo' + \gamma) \text{ (wherein } Avo' = 2.5)$$

by the resistor R7 and circuit CC2 through the brush 23 instead of the aforementioned resistor R3, whereby the voltage at the point B becomes:

$$V_B = \frac{\alpha}{1+\alpha}(Bv + Sv - Avo) + \frac{1}{1+\alpha}(\alpha Avo' + \gamma) \quad (6')$$

The voltage at the point A supplied from the amplifier OP1 is supplied to an input terminal of an amplifier OP3 to subtract a signal representing the present aperture determined by the aperture adjust ring, corresponding to ((Av)present−Avo) in APEX representation, by means of a constant current source CC3 and a variable resistor R4 linked with said aperture adjust ring of the lens. In this case the adjust ring is set at the minimum aperture (largest stop number) or (Av)present=(Av)min, the amplifier OP3 provides at the output terminal C a voltage Vc:

$$Vc = (Bv + Sv - Avo) - (Av_{min} - Avo) \quad (7)$$
$$= Bv + Sv - Av_{min}.$$

The comparison of the equations (5), (6) and (7) with equation for appropriate exposure in APEX representation:

$$Av + Tv = Bv + Sv$$

or $$Tv = Bv + Sv - Av$$

leads to conclusions that the voltage $V_A$ (first correction signal) at the point A indicates the Tv value providing the correct exposure at the maximum lens aperture, i.e. the Tv-value (Tv)a at the section x of the program, that the voltage $V_B$ (program signal) at the point B indicates the TV-value (Tv)b in the section Y of the program and that the voltage $V_C$ (second correction signal) at the point C indicates the Tv value providing the correct exposure at the minimum lens aperture, i.e. the Tv-value (Tv)c at the section z of the program. The voltage $V_A$ is further supplied to a voltage follower F1 constituting a second analog switch and through a switch S2 to comparators CP1, CP3, while the voltage $V_B$ is supplied to a voltage follower F1 constituting a first analog switch and comparators CP1, CP2, and the voltage $V_C$ is supplied to a voltage follower F3 constituting a third analog switch and the comparator CP2. Each of said voltage follower F1, F2 and F3 is provided with an enable terminal or control terminal, and has a characteristic of transmitting the input voltage to the output terminal when the enable terminal is at a high level while providing an unfixed output voltage with an infinite output impedance when the enable terminal is at a low level.

In case of $V_B > V_A$ whereby (Tv)b > (Tv)a, the control is achieved inevitably according to the section x of the program line, since in the section y the lens aperture has to be larger than the maximum lens aperture. In such state the comparator CP1 provided an H-level output while the comparator CP2 provided an L-level output since $V_C$ is smaller than $V_A$. Consequently the enable terminal of the voltage follower F1 is maintained at the L-level by the output from a NOR gate G, while those of the voltage followers F2, F3 are respectively maintained at the H-level and L-level, whereby the voltage $V_A$ is supplied through F2 to a meter M.

In case of $V_A > V_b > V_C$ when the control is conducted according to the section y of the program line, the comparators CP1 and CP2 provide L-level outputs to maintain the enable terminals of the voltage followers F1, F2 and F3 respectively at the H-level, L-level and L-level, whereby the voltage $V_B$ is supplied through F1 to the meter M.

In case of $V_A > V_C > V_B$ wherein the control is achieved in the section z since in the section y the diaphragm aperture has to be smaller than the minimum lens aperture, the comparators CP1 and CP2 respectively provide L-level and H-level output signals to maintain the enable terminals of the voltage followers F1, F2 and F3 respectively at the L-level, L-level and H-level, thus supplying the voltage $V_C$ to the meter M through the voltage follower F3.

Figure 4:
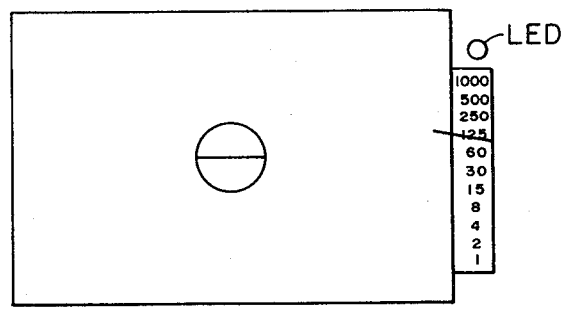
FIG. 4 is a plan view of the indication in the view finder showing an embodiment of the present invention.

As will be understood from the foregoing explanation, the voltage $V_A$, $V_B$ or $V_C$ is supplied to the meter M respectively when the exposure control is conducted accordingly to the section x, y or z of the program line whereby a controlled Tv value can be indicated if the indicator of the meter M is positioned in relation to a scale of the shutter speed as shown in FIG. 4.

Then, as the shutter button is depressed to a second stage, the automatic diaphragm closing lever of the camera is released to reduce the diaphragm aperture of the lens through the function of the lever 12, and, prior to said function, the switch S1 is opened to store the voltage at the junction point between the resistors R1, R2 in a condenser C1, thus fixing the voltage $V_B$. As the diaphragm aperture is closed in time, the light entering the photodiode PD represents the luminance of the object minus the progressively reducing diaphragm aperture, whereby the output voltage $V_A$ of the amplifier OP1 becomes (Bv+Sv−Av) representing the Tv value for appropriate exposure corresponding to the diaphragm aperture at each moment. Said voltage $V_A$ and the stored voltage $V_B$ are compared in the comparator CP1, of which output becomes H-level when $V_A$ becomes equal to $V_B$, to deactivate a solenoid Mg1 thereby terminating the diaphragm aperture reducing function through an unrepresented stopping mechanism. In any case, after the lapse of a time sufficient for terminating the diaphragm aperture reducing operation, the switch S2 is opened to store the voltage $V_A$ in a condenser C2. Thus stored voltage $V_A$ is used as an input voltage for the comparator CP3. Thereafter the mirror is elevated and the shutter mechanism is released, and, when the leading curtain of the shutter begins to move, a trigger switch S4 is opened to activate a logarithmic time conversion circuit composed of an amplifier OP4, a constant voltage circuit E3, a condenser C3, diodes D3, D4, a resistor R3 and a constant current source CC4, thus releasing a voltage corresponding to the Tv value of the exposure time after the start of motion of the leading curtain. When said voltage becomes equal to the stored voltage $V_A$, the comparator CP3 deactivates the solenoid Mg2 to set the trailing curtain of the shutter in motion.

The shutter speed priority mode is selected when the switch S3 is positioned at a terminal 202, wherein an output voltage $V_D$ representing the Tv-value (Tv)m corresponding to the manually selected shutter speed at a point D by means of a constant current source CC5 and a resistor R6 varied in relation to the shutter speed regulating function from the outside, said voltage $V_D$ being supplied to the comparators CP1, CP2.

In case the voltage $V_A$ obtained at the point A in response to the depression of the shutter button to the first stage meets a condition $V_D > V_A > V_C$ wherein the diaphragm aperture required for the appropriate exposure exceeds the maximum lens aperture, the shutter speed has inevitably to be regulated from the manually selected shutter speed. In such case the comparators CP1 and CP2 respectively provide H-level and L-level outputs to supply the voltage $V_A$ to the meter M through the voltage follower F2, thus indicating the appropriate shutter speed at the maximum lens aperture.

In case of $V_A > V_D > V_C$ the shutter speed is set at the manually selected value since the diaphragm aperture is in the regulable range. In this state the comparators CP1, CP2 both provide L-level outputs to supply the voltage $V_B$ to the meter M through the voltage follower F1, thus indicating the manually selected shutter speed.

Finally in case of $V_A > V_C > V_D$ wherein the shutter speed has to be displaced from the manually selected value as otherwise the diaphragm aperture has to be smaller than the minimum lens aperture, the comparators CP1, CP2 respectively provide L-level and H-level outputs to transmit the voltage $V_C$ to the meter M through the voltage follower F3, thus indicating the appropriate shutter speed at the largest stop number.

Then, in response to further depression of the shutter button the exposure time is controlled in the aforementioned manner.

As explained in the foregoing, the meter M indicates the shutter speed actually controlled in relation to the diaphragm aperture, even in the shutter speed priority mode. In this mode the exposure control and the shutter speed indication achieved are always same regardless of whether the interchangeable lens used is equipped with the signalling member for the smallest stop number.

The aperture priority mode is selected when the switch S3 is positioned at a terminal 203, wherein the voltage $V_B$ is shifted forcedly to the ground level. As a resistor R4 provides a signal (Av)preset−Avo representing the manually selected preset diaphragm stop, the voltage $V_C$ shows the Tv value providing a correct exposure in relation to the manually selected preset diaphragm value. On the other hand the voltage $V_B$ becomes smaller than the voltage $V_C$, so that the voltage $V_C$ is supplied to the meter M in the manner as explained in the foregoing. In this mode the output of the comparator CP1 always remains at the L-level so that the lens diaphragm is not stopped until it reaches a value selected by the preset ring of the lens, and the shutter is controlled by the voltage $V_A$ when the diaphragm apertures reaches said selected value.

Thus, also in this mode, there is no difference in the exposure procedure between the lenses having or not having the signalling member for the smallest stop number.

In the present embodiment, there is provided a warning indication for shifted program line in case the programmed exposure control mode is selected and an interchangeable lens not equipped with said signalling member is used. For this purpose the circuit shown in FIG. 3 is provided with a warning indication circuit 30 comprising serially connected switches S5, S6 and a light-emitting diode, said switch S5 being composed of the brush 24 and the terminal 27 shown in FIG. 1. Also the switch S6 is so linked with said switch S3 as to be closed only when the switch S3 is positioned at the terminal 201, and the light-emitting diode LED is lighted in the view finder as shown in FIG. 4 only when said switches S5 and S6 are both closed. In other modes than the programmed exposure control mode the warning LED is extinguished by opening the switch S6 as no difference is caused by the presence or absence of the signalling member on the lens used. Naturally said indication is not limited to the interior of the view finder as shown in FIG. 4.

I claim:

1. An improvement in camera comprising:
   a device capable of accepting interchangeable lenses having a signalling device for transmitting information of the stop number of the maximum lens aperture and a diaphragm adapted to be controlled from said camera at the picture taking operation and further capable of detecting said information of the stop number of the maximum lens aperture, and
   an exposure control device capable of calculating a combination of a diaphragm aperture and an exposure time for the exposure control at the picture taking operation from the optical information of an object received through said interchangeable lens and correcting said combination by means of the information obtained from said detecting device,
   wherein said detecting device comprises means (R3, R7, 23, 26, CC2) for producing an electric output signal corresponding to said information of the stop number of the maximum lens aperture when an interchangeable lens having a signalling device is in engagement therewith, or an electric output signal corresponding to a particular diaphragm stop number when an interchangeable lens without a signalling device is engaged therewith.

2. An improvement in a camera comprising:
   a device capable of accepting interchangeable lenses having a signalling device for transmitting information of the stop number of the maximum lens aperture and a diaphragm adapted to be controlled from said camera at the picture taking operation and further capable of detecting said information of the stop number of the maximum lens aperture, and
   an exposure control device comprising a calculating circuit for calculating a combination of a diaphragm aperture and an exposure time for the exposure control at the picture taking operation from the optical information of an object received through said interchangeable lens,
   wherein said detecting device comprises means (R3, R7, 23, 26, CC3) for producing an electric output signal corresponding to said information of the stop number of the maximum lens aperture when an interchangeable lens having a signalling device is in engagement therewith, or an electric output signal corresponding to a particular diaphragm stop number when an interchangeable lens without a signalling device is engaged therewith.

3. An improvement according to the claim 1 or 2, wherein said means comprises:
   a movable member (21) having an initial position and being adapted to engage with said signalling device upon mounting of an interchangeable lens so as to be displaced from said initial position by an amount determined by said signalling device; and
   converting members (R3, R7, 23 and 26) for generating electric output signals corresponding to the position of said movable member, said converting member being adapted to generate an electric output signal corresponding to said particular diaphragm stop number when said movable member is at said initial position.

4. An improvement according to claim 3, wherein said converting members comprise a fixed resistor (R7), a variable resistor (R3) and switch means (23) so linked with said movable member as to be connected to said fixed resistor or said variable resistor respectively when said movable member is at the initial position or is displaced therefrom.

5. An improvement according to the claim 1 or 2, wherein said detecting device further comprises:
   switch means (S5) linked with the engagement between said means and said signalling device; and
   display means (30) comprising a display element (LED) adapted to function in cooperation with said switch means for indicating the presence or absence of said engagement.

6. An improvement according to the claim 1 or 2, wherein said exposure control device further comprises:
   exposure determining means capable of determining the diaphragm stop number for the exposure control at the picture taking operation independently from said calculating circuit, and switch means (S3) for selecting either the diaphragm stop number determined by said calculating circuit or the diaphragm stop number determined by said exposure determining means, and said detecting device further comprises,
   display means (30) functionable in cooperation with said electric signal generating means for indicating the presence or absence of engagement with said signalling device; and
   second switch means (S6) linked with said switch means so as to enable the function of said display means when said switch means is manipulated to select the diaphragm stop number determined by said calculating circuit.

* * * * *

UNITED STATES PATENT AND TRADEMARK OFFICE
CERTIFICATE OF CORRECTION

PATENT NO. : 4,357,090

DATED : November 2, 1982

INVENTOR(S) : YOSHITAKA ARAKI

It is certified that error appears in the above—identified patent and that said Letters Patent is hereby corrected as shown below:

Column 2, line 24, after "circuit" insert --diagram--.

Column 3, line 6, after "brush" insert --24--;

line 50, change "some" to --same--.

Column 4, line 68, after "practically" insert --acceptable--.

Column 5, line 17, change "telephone" to --telephoto--.

Column 6, line 9, change "coeffficient" to --coefficient--.

Column 7, line 7, change "Y" to --y--;

line 38, change "$V_b$" to --$V_B$--.

IN THE CLAIMS

Column 10, line 24, change "an" to --said--.

Signed and Sealed this

Eleventh Day of January 1983

[SEAL]

Attest:

Attesting Officer

GERALD J MOSSINGHOFF

Commissioner of Patents and Trademarks